United States Patent
Inoue et al.

(10) Patent No.: US 11,760,811 B2
(45) Date of Patent: *Sep. 19, 2023

(54) CARBOXYMETHYLATED CELLULOSE

(71) Applicant: NIPPON PAPER INDUSTRIES CO., LTD., Tokyo (JP)

(72) Inventors: Kazuhiko Inoue, Tokyo (JP); Takeshi Nakatani, Tokyo (JP); Yusuke Tada, Tokyo (JP); Kasumi Nishigaya, Tokyo (JP); Hiroyoshi Suzuki, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/768,945

(22) PCT Filed: Dec. 5, 2018

(86) PCT No.: PCT/JP2018/044690
§ 371 (c)(1),
(2) Date: Jun. 2, 2020

(87) PCT Pub. No.: WO2019/111934
PCT Pub. Date: Jun. 13, 2019

(65) Prior Publication Data
US 2021/0214466 A1 Jul. 15, 2021

(30) Foreign Application Priority Data

| Dec. 7, 2017 | (JP) | 2017-235016 |
| Mar. 20, 2018 | (JP) | 2018-052236 |
| Mar. 20, 2018 | (JP) | 2018-052244 |
| Mar. 20, 2018 | (JP) | 2018-052253 |
| Apr. 12, 2018 | (JP) | 2018-076540 |
| May 16, 2018 | (JP) | 2018-094631 |
| Jul. 19, 2018 | (JP) | 2018-135701 |

(51) Int. Cl.
*C08B 11/12* (2006.01)

(52) U.S. Cl.
CPC .................. *C08B 11/12* (2013.01)

(58) Field of Classification Search
CPC ....................................... C08B 11/12
See application file for complete search history.

(56) References Cited

U.S. PATENT DOCUMENTS

| 4,270,914 A | 6/1981 | Dahl |
| 4,491,661 A | 1/1985 | Bredereck et al. |
| 4,579,943 A | 4/1986 | Kamide et al. |
| 5,722,433 A * | 3/1998 | Ishino ............ A24D 1/02 131/331 |
| 11,092,587 B2 * | 8/2021 | Nakatani ............ G01N 33/36 |
| 11,518,820 B2 * | 12/2022 | Inoue ............ D21C 9/007 |
| 2006/0014721 A1 | 1/2006 | Zhang et al. |
| 2009/0233509 A1 * | 9/2009 | Bellini ............ A61L 15/225 442/324 |
| 2016/0333116 A1 | 11/2016 | Nakatani et al. |
| 2019/0055323 A1 | 2/2019 | Kakubari et al. |
| 2019/0116858 A1 | 4/2019 | Kawasaki et al. |
| 2019/0330767 A1 | 10/2019 | Takaichi et al. |
| 2020/0369787 A1 | 11/2020 | Inoue et al. |
| 2021/0163629 A1 | 6/2021 | Inoue et al. |
| 2021/0180214 A1 | 6/2021 | Inoue et al. |
| 2021/0214465 A1 | 7/2021 | Inoue et al. |

FOREIGN PATENT DOCUMENTS

| EP | 1920787 A2 | 5/2008 |
| JP | S27-1944 B1 | 5/1952 |
| JP | S33-05645 B1 | 7/1958 |
| JP | H01-044201 B2 | 9/1989 |
| JP | H09-176201 A | 7/1997 |
| JP | H10-251301 A | 9/1998 |
| JP | 2002-194001 A | 7/2002 |
| JP | 2007-191558 A | 8/2007 |
| JP | 2008-1728 A | 1/2008 |
| JP | 2008-222859 A | 9/2008 |
| JP | 2012-012553 A | 1/2012 |
| JP | 2013-185122 A | 9/2013 |
| JP | 2015-149929 A | 8/2015 |
| JP | 2017-149901 A | 8/2017 |
| JP | 6228707 B1 | 11/2017 |
| JP | 6337225 B1 | 6/2018 |
| JP | 6351821 B1 | 7/2018 |
| JP | 6417490 B1 | 11/2018 |
| JP | 6442106 B1 | 12/2018 |

(Continued)

OTHER PUBLICATIONS

International Search Report and Written Opinion for Application No. PCT/JP2018/044677, dated Jan. 29, 2019, 7 pages.
International Search Report and Written Opinion for Application No. PCT/JP2018/044697, dated Jan. 12, 2019, 8 pages.
International Search Report and Written Opinion for Application No. PCT/JP2018/044702, dated Feb. 12, 2019, 8 pages.
International Search Report and Written Opinion for Application No. PCT/JP2018/044686, dated Jan. 29, 2019, 4 pages.
International Search Report and Written Opinion for Application No. PCT/JP2018/044690, dated Mar. 5, 2019, 6 pages.
Liu et al., Preparation of Bamboo Nanofibrillated Cellulose with Carboxyl Groups by TEMPO-Mediated Oxidation. Journal of Cellulose Science and Technology. Sep. 2016;24(3):59-66.

(Continued)

*Primary Examiner* — Leigh C Maier
*Assistant Examiner* — Everett White
(74) *Attorney, Agent, or Firm* — McCarter & English, LLP; Wei Song; Thomas F. Foley

(57) ABSTRACT

A carboxymethylated cellulose having a carboxymethyl substitution of no more than 0.50 and a cellulose I type crystallization of at least 50%. Ideally, the anionization is 0.00-1.00 meq/g. The Schopper-Riegler freeness is ideally at least 60.0° SR. Ideally the ratio of filtration residue is 0%-30% by mass. The viscosity (30 rpm, 25° C.) for an aqueous dispersion having a 1% solid content (w/v) is ideally no more than 10.0 mPa·s.

11 Claims, No Drawings

(56) References Cited

FOREIGN PATENT DOCUMENTS

| WO | WO-2014/087767 A1 | 6/2014 |
| WO | WO-2014/088072 A1 | 6/2014 |
| WO | 2017/111016 A1 | 6/2017 |
| WO | WO-2017/199924 A1 | 11/2017 |
| WO | 2019/111928 A1 | 6/2019 |
| WO | 2019/111939 A1 | 6/2019 |
| WO | 2019/111941 A1 | 6/2019 |
| WO | WO-2019/111933 A1 | 6/2019 |

OTHER PUBLICATIONS

Wang et al., Preparation of Nanocellulose from Corn Cob Ethanol Bioresidue and its Effects on Paper Properties. Journal of Tianjin University of Science & Technology. Jun. 2018;33(3):40-45.

Zhu et al.. The Effect of Refining and Carboxymethyl Treatment on Morphology and Crystal Structure of Sugarcane Bagasse Fibers. Sugarcane and Canesugar Oct. 2015;5:51-57.

U.S. Appl. No. 16/768,939, filed Jun. 2, 2020, 2021-0214465, Published.

U.S. Appl. No. 16/769,836, filed Jun. 4, 2020, 2020-0369787, Published.

U.S. Appl. No. 16/769,666, filed Jun. 4, 2020, 2021-0180214, Published.

U.S. Appl. No. 16/770,559, filed Jun. 5, 2020, 2021-0163629, Published.

\* cited by examiner

CARBOXYMETHYLATED CELLULOSE

CROSS-REFERENCE TO RELATED APPLICATIONS

This application is a U.S. national stage filing, under 35 U.S.C. § 371(c), of International Application No. PCT/JP2018/044690, filed on Dec. 5, 2018, which claims priority to Japanese Patent Application No. 2017-235016, filed on Dec. 7, 2017, Japanese Patent Application No. 2018-052236, filed on Mar. 20, 2018, Japanese Patent Application No. 2018-052244, filed on Mar. 20, 2018, Japanese Patent Application No. 2018-052253, filed on Mar. 20, 2018, Japanese Patent Application No. 2018-076540, filed on Apr. 12, 2018, Japanese Patent Application No. 2018-094631, filed on May 16, 2018, and Japanese Patent Application No. 2018-135701, filed on Jul. 19, 2018. The entire contents of each of the aforementioned applications are incorporated herein by reference.

TECHNICAL FIELD

The present invention relates to carboxymethylated cellulose.

BACKGROUND ART

Carboxymethylated celluloses are cellulose derivatives, and are obtained by linking carboxymethyl groups to some of hydroxyl groups in glucose residues constituting cellulose backbones to form ether linkages. Increase in the amount of carboxymethyl groups (namely, increase in the degree of carboxymethyl substitution) allows carboxymethylated celluloses to be dissolved in water. On the other hand, adjusting the degree of carboxymethyl substitution to a proper range allows carboxymethylated celluloses to maintain fibrous shapes in water.

A commonly known method for producing carboxymethylated cellulose is a method including subjecting cellulose to an alkaline treatment (mercerization) and then a treatment with an etherifying agent (also referred to as "carboxymethylation agent") (carboxymethylation, which is also called "etherification). In the method, there are two known processes, one of which includes performing both mercerization and carboxymethylation by using water as a solvent and another of which includes performing both mercerization and carboxymethylation by using an organic solvent as a main solvent (PTL 1 to 4), and the former is called "water mediated method" and the latter is called "solvent mediated method". water mediated method solvent mediated method

CITATION LIST

Patent Literature

PTL 1: Japanese Patent Laid-Open No. 2017-149901
PTL 2: Japanese Patent Laid-Open No. 2008-222859
PTL 3: Japanese Patent Laid-Open No. 2007-191558
PTL 4: Japanese Patent Laid-Open No. 2002-194001

SUMMARY OF INVENTION

Technical Problem

Carboxymethylated celluloses have properties such as thickening property, water absorbability, and water retentivity, and thus are used as additives in various fields such as foods and beverages, cosmetics, and aqueous paints. Such carboxymethylated celluloses widely used are water-soluble polymers which has a degree of carboxymethyl substitution (also referred to as "degree of etherification") of 0.55 or more. On the other hand, carboxymethylated cellulose has been recently researched which have a degree of carboxymethyl substitution of 0.50 or less to retain crystallinity of cellulose and thus does not completely dissolve in water to partially maintain its fibrous shape, and new applications in which the characteristics thereof, such as the shape and crystallinity, are utilized have been searched. An object of the present invention is particularly to provide a carboxymethylated cellulose which is low in degree of carboxymethyl substitution (0.50 or less) and high in degree of crystallization (50% or more) of cellulose I type and has novel characteristics.

Solution to Problem

The present inventors have made studies about a carboxymethylated cellulose which is low in degree of carboxymethyl substitution (0.50 or less) and high in degree of crystallization (50% or more) of cellulose I type. However, a carboxymethylated cellulose having both the degree of carboxymethyl substitution and the degree of crystallization of cellulose I type in the above respective ranges are likely to have uneven quality and thus has the problem such as instability in dispersion. In addition, such a carboxymethylated cellulose easily maintains its fibrous shape in a dispersion medium and is easily formed into an aggregate (clump). The reason for this is probably because carboxymethyl groups are locally introduced into cellulose to thereby ununiformly generate a portion which dissolves in water and a portion which does not dissolve in water in the carboxymethylated cellulose, thereby resulting in the variation in quality, and/or destabilization of dispersion due to such a state of carboxymethyl groups introduced. These phenomena remarkably occur particularly in the case of a low degree of carboxymethyl substitution. It is considered that the reason for this is because the small number of carboxymethyl groups is difficult to introduce into cellulose uniformly (not in a locally concentrated manner at one or several locations). It is also considered that, when a portion which dissolves in a dispersion medium and a portion which does not dissolve in a dispersion medium are ununiformly generated in the carboxymethylated cellulose, the portion which does not dissolve tends to remain as an aggregate.

For example, it is difficult to maintain a degree of crystallization of cellulose I type of 50% or more, when the degree of carboxymethyl substitution is in the range of 0.20 or more and 0.50 or less. The reason for this is probably because carboxymethyl groups are locally introduced into cellulose, thereby causing a portion where the substituents concentrate to first dissolve in water and causing the crystallinity of the entire carboxymethylated cellulose to be lowered.

The present inventors have made intensive studies about a carboxymethylated cellulose which is low in degree of carboxymethyl substitution (0.50 or less) and high in degree of crystallization (50% or more) of cellulose I type in order to produce a carboxymethylated cellulose which is more stable in quality (which is uniformly dispersed). As a result, it has been found that when mercerization (alkaline treatment of cellulose) in a solvent containing mainly water is followed by carboxymethylation (also referred to as "etherification") in a mixed solvent of water and an organic solvent in carboxymethylation of cellulose, a carboxymethylated cellulose having a low degree of carboxymethyl substitution (0.50 or less) and a high degree of crystallization (50% or more) of cellulose I type can be produced which also is stable in quality (uniformly dispersed), is high in the water retentivity, and hardly forms an aggregate when dispersed in water, as compared with any carboxymethylated cellulose obtained according to a conventional water mediated method (method including performing both mercerization and carboxymethylation in water as a solvent) or solvent mediated method (method including performing both mercerization and carboxymethylation in a solvent containing mainly an organic solvent).

The present invention provides the following, but is not limited thereto.

(1) A carboxymethylated cellulose having a degree of carboxymethyl substitution of 0.50 or less and a degree of crystallization of cellulose I type of 50% or more.

(2) The carboxymethylated cellulose according to (1), having a degree of anionization of 0.00 meq/g or more and 1.00 meq/g or less.

(3) The carboxymethylated cellulose according to (1), having a Schopper-Riegler freeness of 60.0°SR or more.

(4) The carboxymethylated cellulose according to (3), having a Canadian standard freeness of 150 ml or less.

(5) The carboxymethylated cellulose according to (1), wherein a dry mass of a filter cake is 0 to 30% by mass relative to a dry mass of the carboxymethylated cellulose added to water, the filter cake being obtained in the following manner: the carboxymethylated cellulose is added to 500 g of water to obtain a mixture, the mixture is stirred at 400 rpm for 5 seconds, and the resulting mixture is subjected to natural filtration through a 20-mesh filter to obtain the filter cake on the filter.

(6) The carboxymethylated cellulose according to (1), wherein when the carboxymethylated cellulose is dispersed in water to form a water dispersion having a solid content of 1% (w/v), the water dispersion has a viscosity (30 rpm, 25° C.) of 10.0 mPa·s or less.

(7) The carboxymethylated cellulose according to any one of (1) to (6), having a structure wherein some of hydroxyl groups in glucose residues constituting cellulose are linked to carboxymethyl groups via ether linkages.

Effects of Invention

It is considered that the carboxymethylated cellulose of the present invention, which has a degree of carboxymethyl substitution of 0.50 or less and a degree of crystallization of cellulose I type of 50% or more, has not only an appropriate degree of carboxymethyl substitution, but also crystallinity remaining therein, and stably provides large effects specific to carboxymethylated cellulose, such as the effect of imparting shape retentivity and water absorbability.

In carboxymethylated celluloses, which are obtained by introducing carboxymethyl groups into cellulose, electrical repulsion of celluloses occurs, resulting in an enhancement in dispersibility of carboxymethylated celluloses in water. If carboxymethyl groups are locally introduced to generate a portion which dissolves in water and a portion which does not dissolve in water, a dispersion to be obtained is unstable. It is considered that a carboxymethylated cellulose which can form a water dispersion having a viscosity (30 rpm, 25° C.) of 10.0 mPa·s or less when dispersed in water to a solid content of 1% (w/v) has carboxymethyl groups uniformly (not locally) introduced into the entire cellulose, and that such a carboxymethylated cellulose hardly causes local dissolution thereof and thus is uniformly dispersed to thereby exhibit a low viscosity.

It is considered that if a carboxymethylated cellulose has carboxymethyl groups locally introduced, the cellulose therein has locally increased hydrophilicity, thereby locally generating a portion which dissolves in water. When the portions which dissolve in water are increased, the absolute value of the degree of anionization increases as measured with a particle charge detector. On the other hand, it can be said that, as the degree of anionization is closer to 0, portions which dissolve in water are few (namely, portions where carboxymethyl groups are locally introduced are few). It is considered that a carboxymethylated cellulose having a degree of anionization of 0.00 meq/g or more and 1.00 meq/g or less has carboxymethyl groups uniformly (not locally) introduced into the entire cellulose. The "degree of anionization", which will be described below in detail, corresponds to the equivalent of charge per unit mass of carboxymethylated cellulose, and is the value (unit: meq/g) obtained by measurement with a particle charge detector according to a titration method.

It is meant that, as the Schopper-Riegler freeness is closer to 100°SR, water retentivity is higher, and it is considered that when a carboxymethylated cellulose having a Schopper-Riegler freeness of 60.0°SR or more is added to, for example, but not limited to, foods or cosmetics, water retentivity of the foods or cosmetics is more enhanced to advantageously provide a moist texture. A carboxymethylated cellulose having a degree of carboxymethyl substitution of 0.50 or less, a degree of crystallization of cellulose I type of 50% or more, and a Schopper-Riegler freeness of 60.0°SR or more maintains a fibrous shape and crystallinity, and thus it is considered that, for example, foods or cosmetics is enhanced in fabricability and ability to retain a shape when such a carboxymethylated cellulose is added to foods or cosmetics.

A carboxymethylated cellulose having a degree of carboxymethyl substitution of 0.50 or less, a degree of crystallization of cellulose I type of 50% or more, and a ratio of the dry mass of a filter cake after natural filtration to the dry mass of the carboxymethylated cellulose added to water (proportion of a filter cake) of 0 to 30% hardly forms an aggregate when dispersed in water to form a dispersion, even though the degree of carboxymethyl substitution and the degree of crystallization are in the above ranges. Such a carboxymethylated cellulose also has crystallinity remaining therein while having an appropriate degree of carboxymethyl substitution, and thus is advantageous in that when it is used as an additive utilizing the effects specific to carboxymethylated cellulose, for example, the effect of imparting shape retentivity, water absorbability, and the like, the carboxymethylated cellulose is hardly formed into a clump in a dispersion medium and therefore is easy to use while exerting such high effects.

DESCRIPTION OF EMBODIMENTS

<Carboxymethylated Cellulose>

The present invention relates to carboxymethylated cellulose. The carboxymethylated cellulose has a structure formed by linking carboxymethyl groups to some of hydroxyl groups in glucose residues constituting cellulose. The carboxymethylated cellulose may be in the form of a salt, and the carboxymethylated cellulose of the present invention is intended to encompass a salt of the carboxymethylated cellulose. Examples of the salt of the carboxymethylated cellulose include metal salts such as a carboxymethylated cellulose sodium salt.

The carboxymethylated cellulose of the present invention preferably maintains at least a portion of a fibrous shape, when dispersed in water. Specifically, it is preferable that a fibrous substance is found in observation of a water dispersion of the carboxymethylated cellulose with an electron microscope or the like. It is also possible to observe a peak of a cellulose I type crystal in observation of the carboxymethylated cellulose of the present invention with X-ray diffraction.

<Degree of Carboxymethyl Substitution>

The carboxymethylated cellulose of the present invention has a degree of carboxymethyl substitution per anhydrous glucose unit of cellulose of 0.50 or less, preferably 0.40 or less. In a case where the degree of substitution is more than 0.50, dissolution in water easily occurs to fail to maintain a fibrous form in water, and the effect of imparting shape retentivity or the like can be reduced. A certain degree of carboxymethyl substitution is required in order to obtain, for example, the effect of imparting shape retentivity and water absorbability by the carboxymethylated cellulose. For example, in a case where the degree of carboxymethyl substitution is less than 0.02, no advantage by introduction of carboxymethyl groups may be obtained in some applications. Accordingly, the degree of carboxymethyl substitution is preferably 0.02 or more, further preferably 0.05 or more, further preferably 0.10 or more, further preferably 0.15 or more, further preferably 0.20 or more, further preferably 0.25 or more. It has been difficult to obtain a carboxymethylated cellulose particularly having a degree of carboxymethyl substitution ranging of 0.20 or more and 0.50 or less and a degree of crystallization of cellulose I type of 50% or more, which will be described below, according to a conventional water mediated method. The present inventors have found that, for example, a production method described below can produce a carboxymethylated cellulose which has a degree of carboxymethyl substitution of 0.20 or more and 0.50 or less and a degree of crystallization of cellulose I type of 50% or more and which is stable in quality (provides a dispersion low in viscosity and/or has a small absolute value of the degree of anionization) and hardly forms an aggregate. The degree of carboxymethyl substitution can be adjusted by controlling the amount of a carboxymethylation agent for reaction to be added, the amount of a mercerizing agent, and the compositional ratio between water and an organic solvent.

The anhydrous glucose unit in the present invention means individual anhydrous glucose (glucose residue) constituting cellulose. The degree of carboxymethyl substitution (also referred to as "degree of etherification") herein represents the proportion of hydroxyl groups replaced with carboxymethyl ether groups among hydroxyl groups of the glucose residue constituting cellulose (the number of carboxymethyl ether groups per glucose residue). The degree of carboxymethyl substitution may be abbreviated as DS.

The method for measuring the degree of carboxymethyl substitution is as follows:

About 2.0 g of a sample is precisely weighed and is put in a 300-mL stoppered conical flask. 100 mL of a liquid obtained by adding 100 mL of nitric acid (special grade) to 1000 mL of nitric acid/methanol is added thereto and the resulting flask was shaken for 3 hours, thereby converting the salt of the carboxymethylated cellulose (CMC) into H-CMC (hydrogen-type carboxymethylated cellulose). 1.5 to 2.0 g of the absolute dry H-CMC is precisely weighed, and put in a 300-mL stoppered conical flask. The H-CMC is wetted with 15 mL of 80% methanol. 100 mL of 0.1 N—NaOH is added thereto, and the resulting flask was shaken at room temperature for 3 hours. Phenolphthalein is used as an indicator to reversely titrate excess NaOH by 0.1 N—$H_2SO_4$, and the degree of carboxymethyl substitution (DS value) is calculated according to the following expressions.

$$A = [(100 \times F' - 0.1 \text{ N—} H_2SO_4 \text{ (mL)} \times F) \times 0.1]/(\text{Absolute dry mass (g) of H-CMC})$$

Degree of carboxymethyl substitution=$0.162 \times A/(1-0.058 \times A)$

F': factor of 0.1 N—$H_2SO_4$
F: factor of 0.1 N—NaOH.

<Degree of Crystallization of Cellulose I Type>

The degree of crystallization of cellulose in the carboxymethylated cellulose fiber of the present invention is 50% or more, more preferably 60% or more, with respect to crystal I type. When the crystallinity is within the above range, the effect of imparting shape retentivity by the carboxymethylated cellulose is highly exhibited. The crystallinity of cellulose can be controlled by the concentration of a mercerizing agent and the temperature in treatment, as well as the degree of carboxymethylation. An alkali at a high concentration is used in mercerization and carboxymethylation to thereby allow a I type crystal of cellulose to be easily converted into a II type crystal; however, for example, the amount of the alkali (mercerizing agent) used can be adjusted to adjust the degree of denaturation, thereby allowing desired crystallinity to be maintained. The upper limit of the degree of crystallization of cellulose I type is not particularly limited. The upper limit is considered to be actually about 90%.

The method for measuring the degree of crystallization of cellulose I type of the carboxymethylated cellulose is as follows:

A sample is placed on a glass cell, and subjected to measurement with an X-ray diffractometer (LabX XRD-6000, manufactured by Shimadzu Corporation). The degree of crystallization is calculated according to a procedure of Segal, et al., and is calculated from the diffraction intensity of the 002 plane at $2\theta=22.6°$ and the diffraction intensity of an amorphous portion at $2\theta=18.5°$ with the diffraction intensity at $2\theta=100$ to $300$ as the baseline in an X-ray diffraction diagram, according to the following expressions.

$$Xc = (I002c - Ia)/I002c \times 100$$

Xc=degree (%) of crystallization of cellulose I type
I002c: diffraction intensity of 002 plane at $2\theta=22.6°$
Ia: diffraction intensity of amorphous portion at $2\theta=18.5°$.

Carboxymethylated celluloses can be commonly produced by subjecting cellulose to an alkaline treatment (mercerization), and thereafter allowing the resulting mercerized cellulose (also referred to as "alkaline cellulose") to react with a carboxymethylation agent (also referred to as "etherifying agent").

<Degree of Anionization>

The degree of anionization (also referred to as "anion charge density") of the carboxymethylated cellulose is preferably 0.00 meq/g or more and 1.00 meq/g or less. In the present invention, the method for measuring the degree of anionization is as follows:

The carboxymethylated cellulose is dispersed in water to form a water dispersion having a solid content of 10 g/L, and the water dispersion is stirred with a magnetic stirrer at 1000 rpm for a whole day and night. The resulting slurry is diluted to 0.1 g/L, 10 ml thereof is taken and titrated by diallyl dimethyl ammonium chloride (DADMAC) having a normality of 1/1000 with a particle charge detector (Mutek Particle Charge Detector 03), and the degree of anionization is calculated from the amount of DADMAC added until the streaming current reaches zero, according to the following expression:

$$q = (V \times c)/m$$

q: degree (meq/g) of anionization
V: amount (L) of DADMAC added until streaming current reaches zero
c: concentration (meq/L) of DADMAC
m: mass (g) of carboxymethylated cellulose in measurement sample.

The "degree of anionization" herein corresponds to the equivalent of DADMAC required for neutralization of anionic groups per unit mass of the carboxymethylated cellulose, as seen from the measurement method, and corresponds to the anion equivalent per unit mass of the carboxymethylated cellulose.

The degree of anionization of the carboxymethylated cellulose is preferably 0.00 meq/g or more and 1.00 meq/g or less, more preferably 0.00 meq/g or more and 0.80 meq/g or less, further preferably 0.00 meq/g or more and 0.60 meq/g or less. It is considered that the carboxymethylated cellulose having a degree of anionization in such a range has carboxymethyl groups not locally, but uniformly entirely introduced into cellulose, as compared with a carboxymethylated cellulose having a degree of anionization higher than 1.00 meq/g, and can stably exhibit the effects specific to carboxymethylated cellulose, for example, the effect of imparting shape retentivity and water absorbability.

<Schopper-Riegler Freeness>

The Schopper-Riegler freeness of the carboxymethylated cellulose is preferably 60.0°SR or more. In the present invention, the method for measuring the Schopper-Riegler freeness is according to JISP 8121-1:2012, and is specifically as follows: The carboxymethylated cellulose is dispersed in water to form a water dispersion having a solid content of 10 g/L, and the water dispersion is stirred with a magnetic stirrer at 1000 rpm for a whole day and night. The resulting slurry is diluted to 1 g/L. A 60-mesh screen (wire thickness: 0.17 mm) is installed in DFR-04 manufactured by Mutec Co. Ltd., the amount of a liquid passing through the mesh within 60 seconds, from 1000 ml of a test liquid, is measured, and the Schopper-Riegler freeness is calculated according to the method of JISP 8121-1:2012.

The Schopper-Riegler freeness is for measuring the degree of draining of a fiber suspension. The lower limit value is 0°SR and the upper limit value is 100°SR. It is indicated that, as the Schopper-Riegler freeness is closer to 100°SR, the draining (the amount of water discharged) is less, namely, the water retentivity of a fiber is higher.

The Schopper-Riegler freeness of the carboxymethylated cellulose is preferably 60.0°SR or more, further preferably 65.0°SR or more. The upper limit is not particularly limited, and is 100.0°SR or less, preferably 90.0°SR or less. A carboxymethylated cellulose having a Schopper-Riegler freeness of 60.0°SR or more is high in water retentivity, and can be said to be suitable for use as a water retention agent in various compositions, for example, but not limited to, foods and cosmetics.

<Canadian Standard Freeness>

The Canadian standard freeness of the carboxymethylated cellulose is preferably 150 ml or less, more preferably 120 ml or less, further preferably 110 ml or less. The Canadian standard freeness is for measuring the degree of draining of a fiber suspension, and it is indicated that, as the value is smaller, the draining (the amount of water discharged) is less, namely, the water retentivity of a fiber is higher. The method for measuring the Canadian standard freeness is as follows:

A sample is prepared according to the same method as in the above Schopper-Riegler freeness, a 60-mesh screen (wire thickness: 0.17 mm) is installed in DFR-04 manufactured by Mutec Co. Ltd., the amount of a liquid passing through the mesh within 60 seconds, from 1000 ml of a test liquid, is measured, and the Canadian standard freeness is calculated according to the method of JISP 8121-2:2012.

<Amount of Water Filtered>

The carboxymethylated cellulose of the present invention preferably provides an amount of water filtered of 400 ml or less, more preferably 380 ml or less, further preferably 370 ml or less. The amount of water filtered is for measuring the degree of draining of a fiber suspension, and it is indicated that, as the value is smaller, the draining (the amount of water discharged) is less, namely, the water retentivity of a fiber is higher. The method for measuring the amount of water filtered is as follows:

A sample is prepared according to the same method as in the above Schopper-Riegler freeness, a 60-mesh screen (wire thickness: 0.17 mm) is installed in DFR-04 manufactured by Mutec Co. Ltd., the amount of a liquid passing through the mesh within 60 seconds, from 1000 ml of a test liquid, is measured, and the amount of water filtered is calculated.

<Proportion of Filter Cake>

When the carboxymethylated cellulose is dispersed in water as a dispersion medium to form a dispersion (water dispersion), formation of less aggregate of the carboxymethylated cellulose is preferable (namely, a small rate of formation of a filter cake is preferable). Specifically, the dry mass of a filter cake is preferably 0 to 30% by mass relative to the dry mass of the carboxymethylated cellulose added to water, in which the filter cake is obtained in the following manner: the carboxymethylated cellulose is added to 500 g of water to obtain a mixture, the mixture is stirred at 400 rpm for 5 seconds, and the resulting mixture is subjected to natural filtration through a 20-mesh filter to obtain the filter cake on the filter (herein, the ratio of the dry mass of the filter cake after natural filtration to the dry mass of the carboxymethylated cellulose added to water is referred to as "proportion of a filter cake", the ratio being calculated according to the above method). In the present invention, the method for measuring the proportion of a filter cake is as follows:

(1) Measurement of Amount of Filter Cake

In a 1-L beaker is put 500 g of water. 5 g of the carboxymethylated cellulose is sampled, and the mass thereof is recorded (the mass of the carboxymethylated cellulose). A stirring blade is installed in a stirrer (IKA (registered trademark) EUROSTAR P CV S1 (manufactured by IKA)), and the water is stirred at 400 rpm. The carboxymethylated cellulose whose mass has been recorded is added at one time to the water being stirred, and the resultant is stirred for 5 seconds after the addition. After completion of the stirring, the power of the stirrer is turned off. After completion of the stirring, natural filtration is rapidly performed by use of a 20-mesh filter whose mass has been weighed in advance. After the natural filtration, the filter and the cake thereon are dried together on a tray at 100° C. for 2 hours. The mass of the filter and the cake thereon is measured, and the mass of the filter is subtracted therefrom, thereby calculating the absolute dry mass (g) of the cake (mass of absolute dry cake).

(2) Calculation of Amount of Moisture in Carboxymethylated Cellulose

A weighing bottle is heated at 100° C. for 2 hours and cooled in a desiccator with silica gel therein, and the absolute dry mass of the weighing bottle is precisely weighed (absolute dry mass of weighing bottle). About 1.5 g of the carboxymethylated cellulose is placed in the weighing bottle, and precisely weighed (mass of CMC before drying). The lid of the weighing bottle is opened, and the content is heated and dried at 105° C. for 2 hours. The lid of the weighing bottle is closed, and the content is cooled in a desiccator with silica gel therein for 15 minutes. The mass of the weighing bottle after drying (including the carboxymethylated cellulose after drying) is precisely weighed (the mass of the weighing bottle with CMC therein after drying). The amount of moisture of the carboxymethylated cellulose is calculated with the following expression:

Moisture (%) of carboxymethylated cellulose=
[{Mass (g) of CMC before drying−(Mass (g) of weighing bottle with CMC therein after drying−Absolute dry mass (g) of weighing bottle)}/Mass (g) of CMC before drying]×100.

(3) Calculation of Proportion of Filter Cake

The mass (g) of the carboxymethylated cellulose and the absolute dry mass (g) of the cake, which are measured in (1), and the moisture (%) in the carboxymethylated cellulose, which is calculated in (2), are used to calculate the proportion of the filter cake of the carboxymethylated cellulose according to the following expression:

Proportion (%) of filter cake of carboxymethylated cellulose=[Absolute dry mass (g) of cake/{Mass (g) of carboxymethylated cellulose×(100−Moisture (%) of carboxymethylated cellulose)/100}]×100.

The proportion of the filter cake of the carboxymethylated cellulose is preferably 0 to 30%, more preferably 0 to 20%, further preferably 0 to 10%. A carboxymethylated cellulose providing a small proportion of a filter cake is easily dispersed and is excellent in handleability.

<Viscosity in Water Dispersion>

When the carboxymethylated cellulose is dispersed in water as a dispersion medium to form a dispersion (water dispersion), the dispersion preferably has a low viscosity. In the present invention, the method for measuring the viscosity is as follows:

The carboxymethylated cellulose is weighed in a glass beaker having a volume of 1000 ml, and dispersed in 900 ml of distilled water, thereby preparing a water dispersion having a solid content of 1% (w/v). The water dispersion is stirred at 600 rpm using a stirrer at 25° C. for 3 hours. Thereafter, the viscosity after 3 minutes with a No. 1 rotor at a rotational speed of 30 rpm is measured with a B-type viscometer (manufactured by Toki Sangyo Co., Ltd) according to the method of JIS-Z-8803.

The viscosity of the carboxymethylated cellulose is preferably 10.0 mPa·s or less, more preferably 8.0 mPa·s or less, further preferably 7.0 mPa·s or less. It is considered that the carboxymethylated cellulose having such a low viscosity has carboxymethyl groups not locally, but uniformly entirely introduced into cellulose, and can more stably exhibit the effects specific to carboxymethylated cellulose, for example, the effect of imparting shape retentivity and water absorbability. The lower limit value of the viscosity is not particularly limited. The lower limit value is considered to be actually about 1.0 mPa·s.

<Others>

The carboxymethylated cellulose may be in the state of a dispersion obtained after production, or may be, if necessary, dried, and re-dispersed in water. The drying method is not limited, and for example, any known method such as a freeze-drying method, a spray-drying method, a shelf-type drying method, a drum drying method, a belt drying method, a drying method including thinly extending on a glass plate or the like, a fluid-bed drying method, a microwave drying method, or a drying method including using heat generating fan under reduced pressure can be used. After drying, the resultant may be, if necessary, pulverized by a cutter mill, a hammer mill, a pin mill, a jet mill, or the like. The method for re-dispersing in water is also not particularly limited, and any known dispersing apparatus can be used.

The carboxymethylated cellulose can be defibrated to form a nanofiber; however, if not particularly required, the carboxymethylated cellulose may be used without formation of a nanofiber because formation of a nanofiber is costly.

The application of the carboxymethylated cellulose is not particularly limited. It is considered that the carboxymethylated cellulose of the present invention, which has a degree of carboxymethyl substitution of 0.50 or less and a degree of crystallization of cellulose I type of 50% or more and is excellent in ability to retain a shape and water absorbability, can be used particularly optimally in an application which requires ability to retain a shape and water absorbability. The carboxymethylated cellulose of the present invention, however, may be used in any application other than the above. The carboxymethylated cellulose is not limited in terms of the field thereof to be used. It is considered that the carboxymethylated cellulose of the present invention can be used as a thickener, a gelling agent, a pasting agent, a food additive, an excipient, an additive for paints, an additive for adhesives, an additive for papermaking, a polishing agent, a compounding material for rubber or plastics, a water retention agent, a shape retention agent, a mud adjuster, a filtration aid, a mud overflow inhibitor, or the like in various fields in which an additive is generally used, for example, foods, beverages, cosmetics, medicines, papermaking, various chemical goods, paints, spray, agricultural chemicals, civil engineering, architecture, electronic materials, flame retardants, household products, adhesives, detergents, aromatic substances, and lubricant compositions.

<Method for Producing Carboxymethylated Cellulose>

Carboxymethylated celluloses can be commonly produced by subjecting cellulose to an alkaline treatment (mercerization), and thereafter allowing the resulting mercerized cellulose (also referred to as "alkaline cellulose") to react with a carboxymethylation agent (also referred to as "etherifying agent").

The carboxymethylated cellulose of the present invention, which has a degree of carboxymethyl substitution of 0.50 or less and a degree of crystallization of cellulose I type of 50% or more, can be produced by, for example, performing mercerization (alkaline treatment of cellulose) in a solvent containing mainly water, and thereafter performing carboxymethylation (also referred to as "etherification") in a mixed solvent of water and an organic solvent, but not limited thereto. The carboxymethylated cellulose thus obtained is characterized by exhibiting a low viscosity when dispersed in water to form a water dispersion, having a small absolute value of the degree of anionization (closer to 0), having a high Schopper-Riegler freeness, and hardly forming an aggregate when dispersed in water to form a water dispersion, as compared with any carboxymethylated cellulose obtained according to a conventional water mediated method (method including performing both mercerization and carboxymethylation in water as a solvent) or a conventional solvent mediated method (method including performing both mercerization and carboxymethylation in a solvent containing mainly an organic solvent). The above method is advantageous in that the rate of effective utilization of a carboxymethylation agent is high. The above method can produce a carboxymethylated cellulose which has a degree of carboxymethyl substitution of 0.50 or less and a degree of crystallization of cellulose I type of 50% or more and forms a water dispersion having a viscosity (30 rpm, 25° C.) of 10.0 mPa·s or less when dispersed in water to a solid content of 1% (w/v). The above method can also produce a carboxymethylated cellulose which has a degree of carboxymethyl substitution of 0.50 or less, a degree of crystallization of cellulose I type of 50% or more, and a degree of anionization of 0.00 meq/g or more and 1.00 meq/g or less. The above method can also produce a carboxymethylated cellulose which has a degree of carboxymethyl substitution of 0.50 or less, a degree of crystallization of cellulose I type of 50% or more, and a Schopper-Riegler freeness of 60.0°SR or more. The above method can also produce a carboxymethylated cellulose which has a degree of carboxymethyl substitution of 0.50 or less, a degree of crystallization of cellulose I type of 50% or more, and a proportion of a filter cake of 0 to 30%.

<Cellulose>

The cellulose in the present invention means polysaccharide having a structure in which D-glucopyranoses (D-glucopyranose is also simply referred to as "glucose residue" or "anhydrous glucose") are connected by β-1,4 linkages. Celluloses are commonly classified to, for example, native cellulose, regenerated cellulose, fine cellulose, and microcrystalline cellulose from which an amorphous region is removed, depending on the source, the production method, and the like. Any of such celluloses can be used as a raw material of the mercerized cellulose in the present invention, and cellulose high in degree of crystallization of cellulose I type is preferably used as a raw material in order that a degree of crystallization of cellulose I type of 50% or more is maintained in the carboxymethylated cellulose. The degree of crystallization of cellulose I type of the cellulose as a raw material is preferably 70% or more, further preferably 80% or more. The method for measuring the degree of crystallization of cellulose I type is as described above.

Examples of the native cellulose include bleached pulp and unbleached pulp (bleached wood pulp or unbleached wood pulp); linter and refined linter; and cellulose produced by microorganisms such as acetic acid bacteria. The raw material of the bleached pulp or unbleached pulp is not limited, and examples thereof include wood, cotton, straw, bamboo, hemp, jute, and kenaf. The method for producing the bleached pulp or unbleached pulp is also not particularly limited, and may be a mechanical method, a chemical method, or a combined intermediate method between these two methods. Examples of the bleached pulp or unbleached pulp classified according to the production method include mechanical pulp (thermomechanical pulp (TMP), groundwood pulp), chemical pulp (sulfite pulp such as needle (softwood) unbleached sulfite pulp (NUSP), and needle bleached sulfite pulp (NBSP), and kraft pulp such as needle unbleached kraft pulp (NUKP), needle bleached kraft pulp (NBKP), leaf (hardwood) unbleached kraft pulp (LUKP), and leaf bleached kraft pulp (LBKP)). Dissolving pulp may also be used, besides papermaking pulp. Dissolving pulp is pulp chemically refined, is mainly used in a dissolved state in chemicals, and serves as a main raw material of an artificial fiber, cellophane, or the like.

Examples of the regenerated cellulose include one obtained by dissolving cellulose in a solvent such as a cuprammonium solution, a cellulose xanthate solution, or a morpholine derivative, and anew subjecting the resultant to spinning. Examples of the fine cellulose include one obtained by subjecting a cellulose material such as the native cellulose or regenerated cellulose to a depolymerization treatment (for example, acid hydrolysis, alkali hydrolysis, enzymatic degradation, a blasting treatment, or a vibration ball mill treatment), and one obtained by mechanically treating the cellulose-based material.

<Mercerization>

The mercerized cellulose (also referred to as "alkaline cellulose") is obtained by using the above cellulose as a raw material and adding a mercerizing agent (alkali) thereto. The carboxymethylated cellulose of the present invention can be obtained in an economic manner by using mainly water as a solvent for a mercerization reaction and a mixed solvent of an organic solvent and water for the next carboxymethylation, according to the method described herein. The carboxymethylated cellulose thus obtained exhibits a low viscosity, when dispersed in water to form a water dispersion. The carboxymethylated cellulose thus obtained is also small in absolute value of the degree of anionization. The carboxymethylated cellulose thus obtained is also high in Schopper-Riegler freeness. The carboxymethylated cellulose thus obtained also less forms an aggregate (namely, is also low in the rate of formation of a filter cake), when dispersed in water to form a water dispersion.

"Using mainly water as a solvent (solvent containing mainly water)" refers to using a solvent containing water in an amount of higher than 50% by mass. The solvent containing mainly water preferably contains 55% by mass or more, more preferably 60% by mass or more, more preferably 70% by mass or more, more preferably 80% by mass or more, further preferably 90% by mass or more, further preferably 95% by mass or more of water. The solvent containing mainly water particularly preferably contains 100% by mass of water (namely, is water). As the proportion of water in mercerization is higher, the advantage of more uniform introduction of a carboxymethyl group into cellulose is obtained. Examples of the solvent (which is mixed with water when use) other than water in the solvent containing mainly water include an organic solvent used as a solvent in carboxymethylation of the later stage. Examples can include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water in an amount of less than 50% by mass, as a solvent for mercerization. The solvent containing mainly water preferably contains 45% by mass or less, further preferably 40% by mass or less, further preferably 30% by mass or less, further preferably 20% by mass or less, further preferably 10% by mass or less, further preferably 5% by mass or less, more preferably 0% by mass of the organic solvent.

Examples of the mercerizing agent include alkali metal hydroxides such as lithium hydroxide, sodium hydroxide, and potassium hydroxide, and these can be used singly or in combinations of two or more thereof. The mercerizing agent is not limited thereto, but such an alkali metal hydroxide can be added to a reactor, for example, in the form of an aqueous solution having a content of the alkali metal hydroxide of 1 to 60% by mass, preferably 2 to 45% by mass, more preferably 3 to 25% by mass.

The amount of the mercerizing agent used may be any amount as long as the carboxymethylated cellulose can satisfy both a degree of carboxymethyl substitution of 0.50 or less and a degree of crystallization of cellulose I type of 50% or more, and is not particularly limited. In one embodiment, the amount thereof is preferably 0.1 mol or more and 2.5 mol or less, more preferably 0.3 mol or more and 2.0 mol or less, further preferably 0.4 mol or more and 1.5 mol or less, per 100 g of cellulose (absolute dry).

The amount of the solvent containing mainly water in mercerization may be any amount as long as a raw material can be stirred and mixed, and is not particularly limited, and the amount thereof is preferably 1.5 to 20 times, more preferably 2 to 10 times as large as that of cellulose as a raw material, in terms of mass.

A mercerization treatment is performed by mixing a starting raw material (cellulose) and the solvent containing mainly water, adjusting the temperature of a reactor to 0 to 70° C., preferably 10 to 60° C., more preferably 10 to 40° C., adding an aqueous solution of a mercerizing agent, and stirring the resultant for 15 minutes to 8 hours, preferably 30 minutes to 7 hours, more preferably 30 minutes to 3 hours. Thus, the mercerized cellulose (alkaline cellulose) is obtained.

The pH in mercerization is preferably 9 or more, and thus the mercerization reaction can progress. The pH is more preferably 11 or more, further preferably 12 or more, and may be 13 or more. The upper limit of the pH is not particularly limited.

Such mercerization can be performed by use of a reactor in which the above respective components can be mixed and stirred while controlling the temperature, and any of various reactor conventionally used in a mercerization reaction can be used. For example, a batch type stirred reactor in which two screws are used to stir and mix the components is preferable in view of uniform mixing ability and also productivity.

<Carboxymethylation>

The carboxymethylated cellulose is obtained by adding a carboxymethylation agent (also referred to as "etherifying agent") to the mercerized cellulose. The carboxymethylated cellulose of the present invention can be obtained in an economic manner by use of a solvent containing mainly water in mercerization and a mixed solvent of water and an organic solvent in carboxymethylation, according to the method described herein. The carboxymethylated cellulose thus obtained exhibits a low viscosity, when dispersed in water to form a water dispersion. The carboxymethylated cellulose thus obtained is also small in absolute value of the degree of anionization. The carboxymethylated cellulose thus obtained is also high in Schopper-Riegler freeness. The carboxymethylated cellulose thus obtained also less forms an aggregate (namely, is also low in the rate of formation of a filter cake), when dispersed in water to form a water dispersion.

Examples of the carboxymethylation agent include monochloroacetic acid, sodium monochloroacetate, methyl monochloroacetate, ethyl monochloroacetate, and isopropyl monochloroacetate. In particular, monochloroacetic acid or sodium monochloroacetate is preferable in terms of their availability.

The amount of the carboxymethylation agent used may be any amount as long as the carboxymethylated cellulose can satisfy both a degree of carboxymethyl substitution of 0.50 or less and a degree of crystallization of cellulose I type of 50% or more, and is not particularly limited. In one embodiment, the carboxymethylation agent is preferably added in an amount ranging from 0.5 to 1.5 mol per anhydrous glucose unit of cellulose. The lower limit of the range is more preferably 0.6 mol or more, further preferably 0.7 mol or more, and the upper limit in the range is more preferably 1.3 mol or less, further preferably 1.1 mol or less. The carboxymethylation agent can be added to a reactor, for example, but not limited to, in the form of an aqueous solution having a content of the carboxymethylation agent of 5 to 80% by mass, more preferably 30 to 60% by mass. The carboxymethylation agent can also be added in the form of a powder without any dissolution.

The molar ratio of the mercerizing agent to the carboxymethylation agent (mercerizing agent/carboxymethylation agent) generally adopted is 0.90 to 2.45 in a case where monochloroacetic acid or sodium monochloroacetate is used as the carboxymethylation agent. The reason for this is as follows: a molar ratio of less than 0.90 can cause a carboxymethylation reaction to insufficiently progress, resulting in remaining of the unreacted monochloroacetic acid or sodium monochloroacetate and thus diseconomy, and a molar ratio of more than 2.45 may cause a side reaction of an excess of the mercerizing agent with monochloroacetic acid or sodium monochloroacetate to progress, resulting in production of a glycolic acid alkali metal salt and thus diseconomy.

The rate of effective utilization of the carboxymethylation agent in carboxymethylation is preferably 15% or more, more preferably 20% or more, further preferably 25% or more, particularly preferably 30% or more. The rate of effective utilization of the carboxymethylation agent refers to the proportion of carboxymethyl groups introduced into cellulose to carboxymethyl groups in the carboxymethylation agent. By using a solvent containing mainly water in mercerization and a mixed solvent of water and an organic solvent in carboxymethylation, the carboxymethylated cellulose of the present invention can be obtained with a high rate of effective utilization of the carboxymethylation agent (namely, in an economic manner without use of large amount of the carboxymethylation agent). The upper limit of the rate of effective utilization of the carboxymethylation agent is not particularly limited, and the upper limit is actually about 80%. The rate of effective utilization of the carboxymethylation agent may be herein abbreviated as AM.

The method for calculating the rate of effective utilization of the carboxymethylation agent is as follows:

$$AM = (DS \times \text{Number of moles of cellulose}) / \text{Number of moles of carboxymethylation agent}$$

DS: Degree of carboxymethyl substitution (the measurement method will be described below)

Number of moles of cellulose: Mass of pulp (Dry mass after drying at 100° C. for 60 minutes)/162

(162 means the molecular weight per glucose unit of cellulose).

The concentration of the raw material of cellulose in the carboxymethylation reaction is not particularly limited, and is preferably 1 to 40% (w/v) in view of an enhancement in rate of effective utilization of the carboxymethylation agent.

The carboxymethylation reaction is allowed to progress in a mixed solvent of water and an organic solvent, the mixed solvent being formed by appropriately adding an organic solvent or an aqueous solution of an organic solvent to the reactor, or alternatively, appropriately reducing the organic solvent other than water for the mercerization treatment, for example, under reduced pressure, at the same time as of addition of the carboxymethylation agent or before or immediately after addition of the carboxymethylation agent, to thereby form the mixed solvent of water and an organic solvent. The timing of addition or reduction of the organic solvent is not particularly limited as long as it is within the time from completion of the mercerization reaction to immediately after addition of the carboxymethylation agent, and is preferably, for example, within 30 minutes before or after addition of the carboxymethylation agent.

Examples of the organic solvent include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water as a solvent for carboxymethylation. In particular, a monohydric alcohol having 1 to 4 carbon atoms is preferable, and a monohydric alcohol having 1 to 3 carbon atoms is further preferable, because compatibility with water is excellent.

The content of the organic solvent in the mixed solvent for carboxymethylation is preferably 20% by mass or more, more preferably 30% by mass or more, further preferably 40% by mass or more, further preferably 45% by mass or more, particularly preferably 50% by mass or more based on the total of water and the organic solvent. A higher content of the organic solvent imparts the advantage, for example, of easy occurrence of uniform substitution with carboxymethyl groups, thus providing of a carboxymethylated cellulose stable in quality. The upper limit of the content of the organic solvent is not limited, and may be, for example, 99% by mass or less. The upper limit is preferably 90% by mass or less, further preferably 85% by mass or less, further preferably 80% by mass or less, further preferably 70% by mass or less in consideration of the cost of the organic solvent added.

The reaction medium (the mixed solvent of water and the organic solvent, containing no cellulose) for carboxymethylation preferably has a lower water content (in other words, a higher organic solvent content) than the reaction medium for mercerization. When the above range is satisfied, the degree of crystallization of the resulting carboxymethylated cellulose can be easily maintained and the carboxymethylated cellulose of the present invention can be more efficiently obtained. In a case where the reaction medium for carboxymethylation has a lower water content (a higher organic solvent content) than the reaction medium for mercerization, the mixed solvent for the carboxymethylation reaction can be advantageously formed by a simple procedure in which a desired amount of the organic solvent is added to the reaction system after completion of the mercerization reaction, in transferring from the mercerization reaction to the carboxymethylation reaction.

The mixed solvent of water and an organic solvent is thus formed, the carboxymethylation agent is added to the mercerized cellulose, and then the resultant is stirred for about 15 minutes to 4 hours, preferably about 15 minutes to 1 hour while the temperature is preferably kept constantly in the range from 10 to 40° C. Mixing of a liquid containing the mercerized cellulose with the carboxymethylation agent is preferably performed by adding the carboxymethylation agent in portions or dropwise, in view of preventing the reaction mixture from being at a high temperature. After the carboxymethylation agent is added, the resulting mixture was stirred for a certain time, and the temperature thereof is, if necessary, raised. An etherification (carboxymethylation) reaction is then performed at a reaction temperature of 30 to 90° C., preferably 40 to 90° C., further preferably 60 to 80° C. for 30 minutes to 10 hours, preferably 1 hour to 4 hours, thereby obtaining the carboxymethylated cellulose. By raising the temperature in the carboxymethylation reaction, the etherification reaction can be performed efficiently in a short time, which is advantageous.

The reactor which has been used in mercerization may be used as it is, or another reactor in which the components can be mixed and stirred while controlling the temperature may be used, in carboxymethylation.

After completion of the reaction, the remaining alkali metal salt may be neutralized with a mineral acid or organic acid. If necessary, an inorganic salt, an organic acid salt, and others as by-product(s) may be removed by washing with water-containing methanol, and the resultant may be dried, pulverized and classified to form the carboxymethylated cellulose or the salt thereof. Examples of an apparatus for use in dry pulverization include impact mills such as a hammer mill and a pin mill, medium mills such as a ball mill and a tower mill, and jet mills. Examples of an apparatus for use in wet pulverization include apparatuses such as a homogenizer, a masscolloider, and a pearl mill.

With respect to the reason why the above production method provides a carboxymethylated cellulose which can form a dispersion having a low viscosity even though the carboxymethylated cellulose has a degree of carboxymethyl substitution of 0.50 or less and a degree of crystallization of cellulose I type of 50% or more; the reason why the above production method provides a carboxymethylated cellulose which is low in absolute value of the degree of anionization even though the carboxymethylated cellulose has a degree of carboxymethyl substitution of 0.50 or less and a degree of crystallization of cellulose I type of 50% or more; the reason why the above production method provides a carboxymethylated cellulose high in Schopper-Riegler freeness; and the reason why the above production method provides a carboxymethylated cellulose which is low in proportion of the filter cake even though the carboxymethylated cellulose has a degree of carboxymethyl substitution of 0.50 or less and a degree of crystallization of cellulose I type of 50% or more; the reasons for these are not clear, but the present inventors consider as follows. Specifically, it is considered that the mercerization reaction is performed in the solvent containing mainly water to thereby allow the mercerizing agent to be easily admixed uniformly and therefore allow the mercerization reaction to be more uniformly generated, and that the presence of the organic solvent in carboxymethylation leads to an increase in the rate of effective utilization of the carboxymethylation agent to thereby allow a side reaction (for example, generation of an alkali metal salt of glycolic acid) due to an excess of the carboxymethylation agent to hardly occur, resulting in stabilization of quality and thus a reduction in viscosity, and also in a decrease in absolute value of the degree of anionization. It is also considered that uniform carboxymethylation leads to an enhancement in water retentivity and less draining. It is also considered that uniform carboxymethylation allows the carboxymethylated cellulose to be easily dispersed uniformly and allows the rate of generation of the filter cake to be decreased. However, theories other than the above are not excluded.

EXAMPLES

Hereinafter, the present invention will be more specifically described with reference to Examples and Comparative Examples, but the present invention is not intended to be limited thereto. Unless particularly noted, "part(s)" and "%" represent "part(s) by mass" and "% by mass".

Example 1

To a twin-screw kneader whose rotational speed was modulated to 100 rpm, were added 130 parts of water and a solution of 20 parts of sodium hydroxide in 100 parts of water, and leaf pulp (LBKP manufactured by Nippon Paper Industries Co., Ltd.) was added thereto in an amount of 100 parts in terms dry mass when dried at 100° C. for 60 minutes. The resultant was stirred and mixed at 30° C. for 90 minutes, to prepare mercerized cellulose. Furthermore, 100 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 30%. After completion of the reaction, the resultant was subjected to neutralization to a pH of about 7 with acetic acid, liquid removal, drying, and pulverization, thereby obtaining a carboxymethylated cellulose sodium salt which had a degree of carboxymethyl substitution of 0.24 and a degree of crystallization of cellulose I type of 73%. The rate of effective utilization of the carboxymethylation agent was 29%. The methods for measuring the degree of carboxymethyl substitution and the degree of crystallization of cellulose I type, and the method for calculating the rate of effective utilization of the carboxymethylation agent are as described above.

The resulting carboxymethylated cellulose sodium salt was dispersed in water to form a 1% (w/v) water dispersion. The viscosity of the resulting water dispersion was measured according to the above method, and was found to be 5.6 mPa·s.

Example 2

A carboxymethylated cellulose sodium salt was obtained in the same manner as in Example 1 except that the amount of IPA added was changed to thereby change the concentration of IPA in the reaction liquid in the carboxymethylation reaction to 50%. The degree of carboxymethyl substitution was 0.31, the degree of crystallization of cellulose I type was 66%, and the rate of effective utilization of the carboxymethylation agent was 37%. The resulting carboxymethylated cellulose sodium salt was dispersed in water to form a water dispersion having a solid content of 1% (w/v), and the viscosity thereof was measured in the same manner as in Example 1 and was found to be 5.6 mPa·s.

Comparative Example 1

A carboxymethylated cellulose sodium salt was obtained in the same manner as in Example 1, except that the solvent for the mercerization reaction contained 10% of water and 90% of IPA and that a solvent having the same composition was also used in the carboxymethylation reaction. The degree of carboxymethyl substitution was 0.29, the degree of crystallization of cellulose I type was 66%, and the rate of effective utilization of the carboxymethylation agent was 35%. The resulting carboxymethylated cellulose sodium salt was dispersed in water to form a water dispersion having a solid content of 1% (w/v), and the viscosity thereof was measured in the same manner as in Example 1 and was found to be 14.4 mPa·s.

TABLE 1

|  | Solvent for mercerization | | Solvent for carboxymethylation | | Degree of carboxymethyl substitution | Degree of crystallization of cellulose I type | Rate of effective utilization of carboxymethylation agent | 1% Viscosity (30 rpm, 25° C.) |
| --- | --- | --- | --- | --- | --- | --- | --- | --- |
|  | Water | Organic solvent | Water | Organic solvent |  |  |  |  |
| Example 1 | 100% | — | 70% | IPA30% | 0.24 | 73% | 29% | 5.6 mPa/s |
| Example 2 | 100% | — | 50% | IPA50% | 0.31 | 66% | 37% | 5.6 mPa/s |
| Comparative Example 1 | 10% | IPA90% | 10% | IPA90% | 0.29 | 66% | 35% | 14.4 mPa·s |

It was found from the results in Table 1 that in Examples 1 and 2, in which mercerization and carboxymethylation were performed in the solvent containing mainly water and the mixed solvent of water and an organic solvent respectively, a dispersion low in viscosity was produced than in Comparative Example 1 (solvent mediated method), in which both mercerization and carboxymethylation were performed in the solvent containing mainly an organic solvent, as a conventional method. It was found that while the carboxymethylated cellulose obtained in Comparative Example 1 locally contained water to be locally swollen, the carboxymethylated cellulose obtained in each of Examples 1 and 2 formed a more homogeneous dispersion.

Example 3

To a twin-screw kneader whose rotational speed was modulated to 100 rpm, were added 130 parts of water and a solution of 20 parts of sodium hydroxide in 100 parts of water, and leaf pulp (LBKP manufactured by Nippon Paper Industries Co., Ltd.) was added thereto in an amount of 100 parts in terms dry mass when dried at 100° C. for 60 minutes. The resultant was stirred and mixed at 30° C. for 90 minutes, to prepare mercerized cellulose. Furthermore, 100 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 30%. After completion of the reaction, the resultant was subjected to neutralization to a pH of about 7 with acetic acid, liquid removal, drying, and pulverization, thereby obtaining a carboxymethylated cellulose sodium salt which had a degree of carboxymethyl substitution of 0.24 and a degree of crystallization of cellulose I type of 73%. The rate of effective utilization of the carboxymethylation agent was 29%. The respective methods for measuring the degree of carboxymethyl substitution and the degree of crystallization of cellulose I type, and the method for calculating the rate of effective utilization of the carboxymethylation agent are as described above.

The degree of anionization of the resulting carboxymethylated cellulose sodium salt was measured according to the above method, and was found to be 0.32 meq/g.

Example 4

A carboxymethylated cellulose sodium salt was obtained in the same manner as in Example 3 except that the amount of IPA added was changed to thereby change the concentration of IPA in the reaction liquid in the carboxymethylation reaction to 50%. The degree of carboxymethyl substitution was 0.31, the degree of crystallization of cellulose I type was 66%, and the rate of effective utilization of the carboxymethylation agent was 37%. The degree of anionization of the resulting carboxymethylated cellulose sodium salt was measured in the same manner as in Example 3, and was found to be 0.53 meq/g.

Comparative Example 2

A carboxymethylated cellulose sodium salt was obtained in the same manner as in Example 3, except that the solvent for the mercerization reaction contained 10% of water and 90% of IPA and that a solvent having the same composition was also used in the carboxymethylation reaction. The degree of carboxymethyl substitution was 0.29, the degree of crystallization of cellulose I type was 66%, and the rate of effective utilization of the carboxymethylation agent was 35%. The degree of anionization of the resulting carboxymethylated cellulose sodium salt was measured in the same manner as in Example 3, and was found to be 1.10 meq/g.

solution of 20 parts of sodium hydroxide in 100 parts of water, and leaf pulp (LBKP manufactured by Nippon Paper Industries Co., Ltd) was added thereto in an amount of 100 parts in terms of dry mass when dried at 100° C. for 60 minutes. The resultant was stirred and mixed at 30° C. for 90 minutes, to prepare mercerized cellulose. Furthermore, 100 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 30%. After completion of the reaction, the resultant was subjected to neutralization to a pH of about 7 with acetic acid, liquid removal, drying, and pulverization, thereby obtaining a carboxymethylated cellulose sodium salt. The degree of carboxymethyl substitution was 0.24, the degree of crystallization of cellulose I type was 73%, the Schopper-Riegler freeness was 66.7°SR, the Canadian standard freeness was 106 ml, and the amount of water filtered was 369 ml/10 seconds. The rate of effective utilization of the carboxymethylation agent was 29%. The respective methods for measuring the degree of carboxymethyl substitution, the degree of crystallization of cellulose I type, the Schopper-Riegler freeness, the Canadian standard freeness, and the amount of water filtered, and the method for calculating the rate of effective utilization of the carboxymethylation agent are as described above.

Example 6

A carboxymethylated cellulose sodium salt was obtained in the same manner as in Example 5 except that the amount of IPA added was changed to thereby change the concen-

TABLE 2

| | Solvent for mercerization | | Solvent for carboxymethylation | | Degree of carboxymethyl substitution | Degree of crystallization of cellulose I type | Rate of effective utilization of carboxymethylation agent | Degree of anionization (meq/g) |
|---|---|---|---|---|---|---|---|---|
| | Water | Organic solvent | Water | Organic solvent | | | | |
| Example 3 | 100% | — | 70% | IPA30% | 0.24 | 73% | 29% | 0.32 |
| Example 4 | 100% | — | 50% | IPA50% | 0.31 | 66% | 37% | 0.53 |
| Comparative Example 2 | 10% | IPA90% | 10% | IPA90% | 0.29 | 66% | 35% | 1.10 |

It was found from the results in Table 2 that in Examples 3 and 4, in which mercerization and carboxymethylation were performed in the solvent containing mainly water and the mixed solvent of water and an organic solvent respectively, a carboxymethylated cellulose smaller in absolute value of the degree of anionization was produced than in Comparative Example 2 (solvent mediated method), in which both mercerization and carboxymethylation were performed in the solvent containing mainly an organic solvent, as a conventional method. It was found that while the carboxymethylated cellulose obtained in Comparative Example 2 locally contained water to be locally swollen, the carboxymethylated cellulose obtained in each of Examples 3 and 4 formed a more homogeneous dispersion.

Example 5

To a twin-screw kneader whose rotational speed was modulated to 100 rpm, were added 130 parts of water and a tration of IPA in the reaction liquid in the carboxymethylation reaction to 50%. The degree of carboxymethyl substitution was 0.31, the degree of crystallization of cellulose I type was 66%, the Schopper-Riegler freeness was 71.3°SR, the Canadian standard freeness was 85 ml, the amount of water filtered was 302 ml/10 seconds, and the rate of effective utilization of the carboxymethylation agent was 37%.

Comparative Example 3

A carboxymethylated cellulose sodium salt was obtained in the same manner as in Example 5, except that the solvent for the mercerization reaction contained 10% of water and 90% of IPA and that a solvent having the same composition was also used in the carboxymethylation reaction. The degree of carboxymethyl substitution was 0.29, the degree of crystallization of cellulose I type was 66%, the Schopper-Riegler freeness was 57.7°SR, the Canadian standard freeness was 157 ml, the amount of water filtered was 447 ml/10 seconds, and the rate of effective utilization of the carboxymethylation agent was 35%.

TABLE 3

|  |  | Example 5 | Example 6 | Comparative Example 3 |
|---|---|---|---|---|
| Solvent for mercerization | Water | 100% | 100% | 10% |
|  | Organic solvent | — | — | IPA90% |
| Solvent for carboxymethylation | Water | 70% | 50% | 10% |
|  | Organic solvent | IPA30% | IPA50% | IPA90% |
| Rate of effective utilization of carboxymethylation agent |  | 29% | 37% | 35% |
| Degree of carboxymethyl substitution |  | 0.24 | 0.31 | 0.29 |
| Degree of crystallization of cellulose I type |  | 73% | 66% | 66% |
| Schopper-Riegler freeness (° SR) |  | 66.7 | 71.3 | 57.7 |
| Canadian standard freeness (ml) |  | 106 | 85 | 157 |
| Amount of water filtered (ml/10 seconds) |  | 369 | 302 | 447 |

It was found from the results in Table 3 that in Examples 5 and 6, in which mercerization and carboxymethylation were performed in the solvent containing mainly water and the mixed solvent of water and an organic solvent respectively, a carboxymethylated cellulose high in Schopper-Riegler freeness and small in Canadian standard freeness and amount of water filtered was produced than in Comparative Example 3 (solvent mediated method), in which both mercerization and carboxymethylation were performed in the solvent containing mainly an organic solvent, as a conventional method. It was found that while the carboxymethylated cellulose obtained in Comparative Example 3 locally contained water to be locally swollen, the carboxymethylated cellulose obtained in each of Examples 5 and 6 formed a more homogeneous dispersion.

Example 7

To a twin-screw kneader whose rotational speed was modulated to 100 rpm, were added 130 parts of water and a solution of 20 parts of sodium hydroxide in 100 parts of water, and leaf pulp (LBKP manufactured by Nippon Paper Industries Co., Ltd) was added thereto in an amount of 100 parts in terms of dry mass when dried at 100° C. for 60 minutes. The resultant was stirred and mixed at 30° C. for 90 minutes, to prepare mercerized cellulose. Furthermore, 100 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 30%. After completion of the reaction, the resultant was subjected to neutralization to a pH of about 7 with acetic acid, liquid removal, drying, and pulverization, thereby obtaining a carboxymethylated cellulose sodium salt having a degree of carboxymethyl substitution of 0.24 and a degree of crystallization of cellulose I type of 73%. The rate of effective utilization of the carboxymethylation agent was 29% and the proportion of the filter cake was 7%. The respective methods for measuring the degree of carboxymethyl substitution and the degree of crystallization of cellulose I type, and the respective methods for calculating the rate of effective utilization of the carboxymethylation agent and the proportion of the filter cake are as described above.

Example 8

A carboxymethylated cellulose sodium salt was obtained in the same manner as in Example 7 except that the amount of IPA added was changed to thereby change the concentration of IPA in the reaction liquid in the carboxymethylation reaction to 50%. The degree of carboxymethyl substitution was 0.31, the degree of crystallization of cellulose I type was 66%, the rate of effective utilization of the carboxymethylation agent was 37%, and the proportion of the filter cake was 2%.

Example 9

A carboxymethylated cellulose sodium salt was obtained in the same manner as in Example 7 except that the amount of IPA added was changed to thereby change the concentration of IPA in the reaction liquid in the carboxymethylation reaction to 65%. The degree of carboxymethyl substitution was 0.20, the degree of crystallization of cellulose I type was 74%, the rate of effective utilization of the carboxymethylation agent was 25%, and the proportion of the filter cake was 3%.

Comparative Example 4

A carboxymethylated cellulose sodium salt was obtained in the same manner as in Example 7, except that the solvent for the mercerization reaction contained 10% of water and 90% of IPA and that a solvent having the same composition was also used in the carboxymethylation reaction. The degree of carboxymethyl substitution was 0.29, the degree of crystallization of cellulose I type was 66%, the rate of effective utilization of the carboxymethylation agent was 35%, and the proportion of the filter cake was 48%.

Comparative Example 5

A carboxymethylated cellulose sodium salt was obtained in the same manner as in Example 7, except that the solvent for the mercerization reaction contained 19% of water and 81% of IPA and that a solvent having the same composition was also used in the carboxymethylation reaction. The degree of carboxymethyl substitution was 0.60, the degree of crystallization of cellulose I type was 0%, the rate of effective utilization of the carboxymethylation agent was 67%, and the proportion of the filter cake was 91%.

TABLE 4

|  |  | Example 7 | Example 8 | Example 9 | Comparative Example 4 | Comparative Example 5 |
|---|---|---|---|---|---|---|
| Solvent for mercerization | Water | 100% | 100% | 100% | 10% | 19% |
|  | Organic solvent | — | — | — | IPA90% | IPA81% |
| Solvent for carboxymethylation | Water | 70% | 50% | 35% | 10% | 19% |
|  | Organic solvent | IPA30% | IPA50% | IPA65% | IPA90% | IPA81% |
| Rate of effective utilization of carboxymethylation agent |  | 29% | 37% | 25% | 35% | 67% |
| Degree of carboxymethyl substitution |  | 0.24 | 0.31 | 0.20 | 0.29 | 0.60 |
| Degree of crystallization of cellulose I type |  | 73% | 66% | 74% | 66% | 0% |
| Proportion of filter cake |  | 7% | 2% | 3% | 48% | 91% |

It was found from the results in Table 4 that the carboxymethylated cellulose of each Examples 7 to 9, in which mercerization and carboxymethylation were performed in the solvent containing mainly water and the mixed solvent of water and an organic solvent respectively, was significantly low in proportion of the filter cake (namely, was hardly formed into a clump when dispersed in water), as compared with the carboxymethylated cellulose of each of Comparative Examples 4 and 5 (solvent mediated method), which was obtained by performing both mercerization and carboxymethylation in the solvent containing mainly an organic solvent, as a conventional method. It was found that while the carboxymethylated cellulose obtained in each of Comparative Examples 4 and 5 locally contained water to be locally swollen, the carboxymethylated cellulose obtained in each of Examples 7 to 9 formed a more homogeneous dispersion.

The invention claimed is:

1. A carboxymethylated cellulose having a degree of carboxymethyl substitution of 0.50 or less, a degree of crystallization of cellulose I type of 50% or more, and a portion of a filter cake being 0 to 30%, wherein the portion of the filter cake is determined by a method comprising the steps of:
   adding 5 g of the carboxymethylated cellulose to 500 g of water to obtain a mixture,
   stirring the mixture at 400 rpm for 5 seconds,
   subjecting the stirred mixture to natural filtration through a 20-mesh filter to obtain the filter cake on the filter,
   drying the filter cake on the filter at 100° C. for 2 hours,
   determining an absolute dry mass (g) of the filter cake,
   determining an amount of moisture (%) in the carboxymethylated cellulose, and
   calculating the proportion of the filter cake by using the following expression:
   proportion (%) of filter cake=[the absolute dry mass (g) of filter cake/{5 (g)×(100−the amount of moisture (%) in the carboxymethylated cellulose)/100}]×100.

2. The carboxymethylated cellulose according to claim 1, having a degree of anionization of 0.00 meq/g or more and 1.00 meq/g or less.

3. The carboxymethylated cellulose according to claim 2, having a structure wherein some of hydroxyl groups in glucose residues constituting cellulose are linked to carboxymethyl groups via ether linkages.

4. The carboxymethylated cellulose according to claim 1, having a Schopper-Riegler freeness of 60.0° SR or more.

5. The carboxymethylated cellulose according to claim 4, having a Canadian standard freeness of 150 ml or less.

6. The carboxymethylated cellulose according to claim 5, having a structure wherein some of hydroxyl groups in glucose residues constituting cellulose are linked to carboxymethyl groups via ether linkages.

7. The carboxymethylated cellulose according to claim 4, having a structure wherein some of hydroxyl groups in glucose residues constituting cellulose are linked to carboxymethyl groups via ether linkages.

8. The carboxymethylated cellulose according to claim 1, wherein when the carboxymethylated cellulose is dispersed in water to form a water dispersion having a solid content of 1% (w/v), the water dispersion has a viscosity (30 rpm, 25° C.) of 10.0 mPa·s or less.

9. The carboxymethylated cellulose according to claim 8, having a structure wherein some of hydroxyl groups in glucose residues constituting cellulose are linked to carboxymethyl groups via ether linkages.

10. The carboxymethylated cellulose according to claim 1, having a structure wherein some of hydroxyl groups in glucose residues constituting cellulose are linked to carboxymethyl groups via ether linkages.

11. The carboxymethylated cellulose according to claim 1, wherein the portion of a filter cake is 0 to 20%.

* * * * *